G. G. BUCKLAND.
WHEEL.
APPLICATION FILED SEPT. 30, 1918.

1,315,178.

Patented Sept. 2, 1919.

George Gardner Buckland

UNITED STATES PATENT OFFICE.

GEORGE GARDNER BUCKLAND, OF SAN FRANCISCO, CALIFORNIA.

WHEEL.

1,315,178.   Specification of Letters Patent.   Patented Sept. 2, 1919.

Application filed September 30, 1918. Serial No. 256,302.

*To all whom it may concern:*

Be it known that I, GEORGE GARDNER BUCKLAND, a citizen of the United States, residing at San Francisco, in the county of San Francisco and State of California, have invented new and useful Improvements in Wheels, of which the following, taken in connection with the one sheet of accompanying drawings, is a full, clear, and exact description.

My invention relates to improvements in vehicle wheels of the class which use pneumatic tires, and has for its objects the production of a simple, practical, economical, effective construction, to prevent rim cutting in case of accidental deflation, and in which the tire is easily removed and replaced, and to this end it consists, essentially, in a rim formed flat on its outer periphery through which in staggered holes are placed the nipples of the wire spokes, its side edges extending inwardly converging toward each other at an angle of approximately 45°, forming a channel entirely on the inner side of the rim, fitting snugly against the inner side of the tire bases: in combination with a pair of expansible, outwardly channeled interlocking tireholder rings, cut on one side, fitting and holding the tire bases against the aforesaid angularly, inwardly channeled rim edges. The outer edges of the expansible channeled rings fitting the outside of the tire bases, while their inner edges fit the angular edges of the rim channel, interlocking therewith, being more securely held by one or more expanding jackscrews.

In describing this invention, reference is had to the accompanying drawings, forming a part of this specification, in which like letters and figures indicate corresponding parts in all the views.

Fig. 4 is a detail in cross section, showing the expansible locking jackscrew. One or more of these little screws may be used to hold the expansible rings firmly to their seats.

Figure 1:
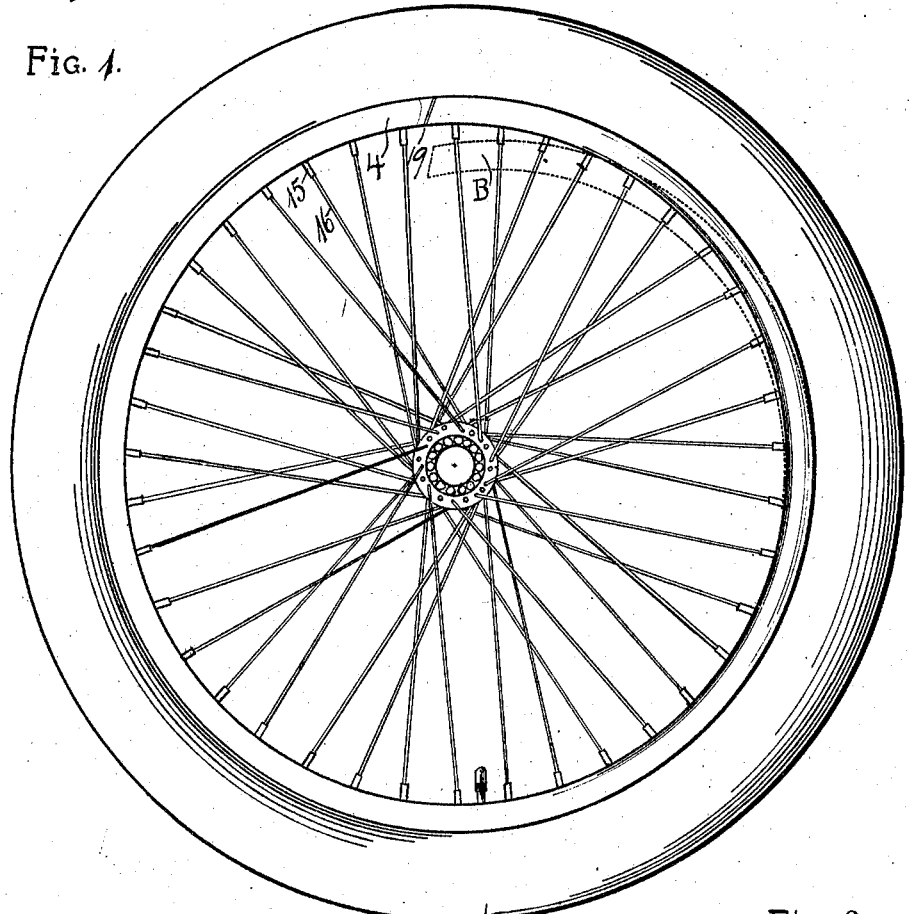
Figure 1 is a side elevation of the wheel and tire, showing the cut on one side in the expansible tireholder ring at 19, the dotted lines at —B— indicating how one end of the cut ring tireholder springs inwardly for removal.

In Fig. 1, 1 is the tire, 2 is the tube, 3 is the usual protecting fabric, 4 is the expansible cut ring tireholder cut at 19. The dotted lines at B, show the position of the ends of the cut ring tireholders sprung inwardly to free the tire for removal.

Figure 2:
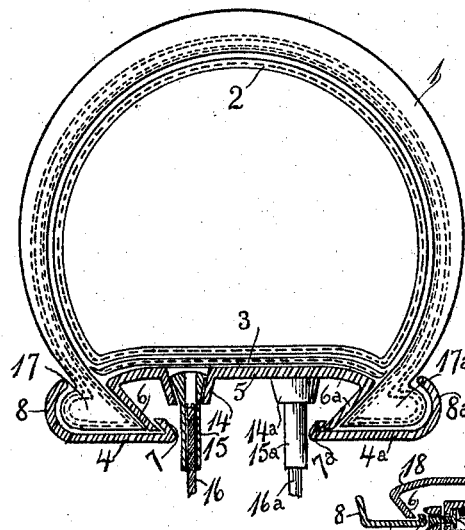
Fig. 2 is a transverse detail vertical sectional view, showing the outer edges of the expansible outwardly channeled cut ring tireholders adapted to a tire of the clencher type.
Figure 3:
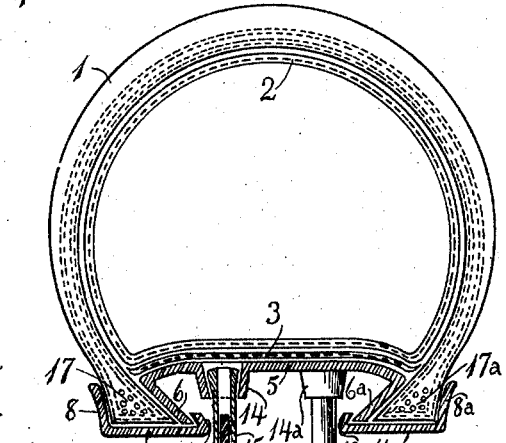
Fig. 3 is a transverse detail vertical sectional view, showing the outer edges of the expansible outwardly channeled tireholder rings adapted to a tire of the side wire type.

In Fig. 2 also Fig. 3, 4, 4$^a$, are the expansible cut ring tireholders. 5 is the rim, made slightly oval at 18, 18$^a$. 6, 6$^a$, are the edges of the rim turned inwardly at substantially the same angle as the tire is on the inside thereof at 17, 17$^a$. 7, 7$^a$, are the inner and locking edges of the expansible cut ring tireholders, made at an angle to lock with the turned in edges 6, 6$^a$ of the rim, the pressure of the air within the tire spreading them to a locked position with the rim. 14, 14$^a$, are the countersunk holes for the spoke nipples. 8, 8$^a$, are the outer turned edges of the expansible cut ring tireholders turned inwardly as in Fig. 2 to suit the bases of a clencher tire and outwardly as in Fig. 3, to suit the bases of a side wire tire.

In Fig. 4, 4, 4$^a$, are the expansible cut ring tireholders showing an expansible jackscrew between them. 9 is the loose swivel, turning on rivet 10, fitting against the inner edges at 7, 7$^a$, of the tireholders. 11 is the nut or body proper of the jackscrew, threaded on the inside, into which enters the screw 12, with its outer end at 13 made to fit against the tireholders at 7, 7$^a$.

After the tire is placed over the rim 5, and the two expansible cut ring tireholders 4, 4$^a$, sprung as at B into place. Any desired number of these little expanding jackscrews may be placed between the tireholders, and nut 11 turned until the tireholders 4, 4$^a$, become securely seated against the rim edges 6, 6$^a$, thereby positively locking them in place.

I do not claim a wheel broadly for I am aware that many forms of wheels are in use. I believe it is new to turn the rim edges inwardly at an angle corresponding to the inside edges of the modern tire, while at the same time forming them into hook edges against which the air pressure in the tire pulls axially outward the two expansible cut ring tireholders with their inner edges correspondingly formed to lock within the angularly inturned edges of the rim.

At the place where the valve stem enters the rim, the rim will be dented inwardly to leave a flat smooth exterior.

While I have shown my wheel in the drawings herewith constructed of wire spokes, it is understood that wooden spokes may be substituted if desired.

Having thus described by invention, I claim—

The combination of a pneumatic tire and an inwardly channeled wheel rim between its bases, with two outwardly channeled expansible cut ring tireholders, their inner edges, fitting within and angularly interlocking with the two angularly inturned edges of said inwardly channeled rim: having each of their outer edges turned or shaped to fit the outer edges of the tire bases, and each of their inner edges turned or shaped to fit inside of the angularly inturned edges of the inwardly channeled rim, and being held more securely thereby by expansible jackscrews placed axially between said cut ring tireholders to force them axially against said inwardly channeled rim edges.

In testimony whereof I have hereunto set my hand, Sept. 2, 1918.

GEORGE GARDNER BUCKLAND.

Copies of this patent may be obtained for five cents each, by addressing the "Commissioner of Patents, Washington, D. C."